United States Patent [19]

Williamson

[11] Patent Number: 5,022,993

[45] Date of Patent: *Jun. 11, 1991

[54] PROCESS FOR TREATING WASTEWATER

[75] Inventor: Ronald E. Williamson, Hillsborough, N.C.

[73] Assignee: Orange Water and Sewer Authority, Carrboro, N.C.

[*] Notice: The portion of the term of this patent subsequent to Oct. 17, 2006 has been disclaimed.

[21] Appl. No.: 389,885

[22] Filed: Aug. 4, 1989

Related U.S. Application Data

[63] Continuation-in-part of Ser. No. 238,059, Aug. 30, 1988, Pat. No. 4,874,519, which is a continuation-in-part of Ser. No. 201,185, Jun. 2, 1988, abandoned.

[51] Int. Cl.$^5$ .............................................. B01D 3/30
[52] U.S. Cl. .................................... 210/605; 210/615; 210/624; 210/625; 210/903; 210/906
[58] Field of Search .............. 210/605, 607, 615, 624, 210/625, 630, 903, 906

[56] References Cited

U.S. PATENT DOCUMENTS

| | | | |
|---|---|---|---|
| 2,517,792 | 8/1950 | Kraus | 210/605 |
| 3,300,402 | 1/1967 | Grich et al. | 210/630 |
| 3,654,147 | 4/1972 | Levin et al. | 210/906 |
| 3,930,998 | 1/1976 | Knopp et al. | 210/630 |
| 4,141,822 | 2/1979 | Levin et al. | 210/906 |
| 4,267,038 | 5/1981 | Thompson | 210/605 |
| 4,487,697 | 12/1984 | Böhnke et al. | 210/903 |
| 4,664,804 | 5/1987 | Morper et al. | 210/605 |
| 4,874,519 | 10/1989 | Williamson | 210/605 |

FOREIGN PATENT DOCUMENTS 137919 10/1979 German Democratic Rep. .
5389259 8/1978 Japan .

Primary Examiner—Stanley Silverman
Assistant Examiner—Christopher Upton
Attorney, Agent, or Firm—Rhodes, Coats & Bennett

[57] ABSTRACT

The present invention entails a process for treating wastewater utilizing a return activated sludge process. Primary sludge is separated from the wastewater stream and conveyed into a fermentation tank and held a sufficient time to permit hydrolysis of suspended solids so as to produce soluble substrates. Part of the soluble substrates are mixed with nutrified return activated sludge and held for a selected time period to form conditioned return activated sludge. Thereafter, the conditioned return activated sludge is mixed in an initial aerobic treatment zone with pretreated wastewater. Thereafter, the mixed conditioned return activated sludge and pretreatd wastewater is conveyed through a series of treatment zones, which includes at least one anoxic treatment zone, to which part of the soluble substrates are added, where nitrogen and other pollutants are removed from the wastewater.

3 Claims, 5 Drawing Sheets

PROCESS FOR TREATING WASTEWATER

RELATED APPLICATION

This is a continuation-in-part of U.S. patent application Ser. No. 238,059 filed Aug. 30, 1988, now U.S. Pat. No. 4,874,519, which was a continuation-in-part of U.S. patent application Ser. No. 201,185, filed June 2, 1988, now abandoned.

FIELD OF THE INVENTION

The present invention relates to processes for treating wastewater, and more particularly to a biological process for removing phosphorus and other pollutants from wastewater.

BACKGROUND OF THE INVENTION

Wastewater treating processes usually include multiple treatment areas or zones which can be roughly broken down into: (1) a preliminary treatment area; (2) a primary treatment area; and (3) a secondary treatment area.

The wastewater treatment process begins with the preliminary treatment area. Preliminary treatment is concerned with removing grit and damaging debris, such as cans, bath towels, etc., from the untreated wastewater. This is usually a two-stage treatment process whereby the debris such as rags and cans are removed by screens and the grit and heavier inorganic solids settle out of the untreated wastewater as it passes through a velocity controlled zone. The damaging inorganic debris is thus removed by screening or settling while organic matter carried within the fluid stream passes on.

Following the preliminary treatment area, the wastewater is directed to a primary treatment area. The primary treatment area entails a physical process wherein a portion of the organics are removed by flotation or sedimentation. The organics removed include feces, food particles, grease, paper, etc. and are technically defined as suspended solids. Usually 40-70% of the suspended solids are removed in this primary stage.

The third treatment stage is called secondary treatment and is usually a biological treatment process where bacteria are utilized under controlled conditions to remove nutrients or nonsettling suspended and soluble organics from the wastewater. These materials would result in an unacceptable biological oxygen demand (BOD) if left untreated. Typically, one mode of this process consists of a basin in which the wastewater is mixed with a suspension of microorganisms. This mixture is then aerated to provide oxygen for the support of the microorganisms which may then adsorb, assimilate, and metabolize the excess biological oxygen demand in the wastewater. After sufficient retention time, the mixture is then introduced into a clarifier or settler into which the biomass separates as settled sludge from the liquid. The purified fluid then overflows into a receiving stream.

There are three principal types of secondary treatment for effecting treatment of wastewater. The first type, known as a trickling filter, allows the wastewater to trickle down through a bed of stone whereby the organic material present in the wastewater is oxidized by the action of microorganisms attached to the stone. A similar concept is the RBC or rotating biological contactor wherein the biology is attached to the media which rotates in the wastewater and purifies it in the manner of a trickling filter. The second method is an activated sludge process in which the wastewater is fully aerated and agitated by either compressed air or mechanical means together with a portion of the biomass which has been returned from the clarifier or settler. The third process may be referred to as a semi-aerobic (anaerobic/oxic) process in which the first stage is anaerobic or anoxic and is followed by an oxic stage. This anaerobic-oxic-anoxic process is very similar to the initial stages of the Phoredox process and the modified Bardenpho process, both well known in the wastewater treatment industry.

This anaerobic-oxic process was first disclosed in U.S. Pat. Nos. 2,788,127 and 2,875,151 to Davidson which issued in 1957 and 1959, respectively. In the anaerobic-oxic process, the untreated wastewater is first subjected to anaerobic treatment and then to aerobic decomposition. A portion of the sludge formed during the aerobic decomposition is recycled back and mixed with the untreated wastewater being subjected to anaerobic treatment. Davidson noted that the aerobic organisms in the recycled activated sludge are not impaired by passage through the anaerobic reactor and may, in fact, undergo unusual stimulation. Heidi and Pasveer confirmed the work of Davidson in 1974 and found that soluble $BOD_5$ removal occurred in the anaerobic zone.

In recent years, there has been a great deal of work directed at biological processes for removing pollutants such as phosphorus and nitrogen (TKN) from wastewater. This work has in large part been broadly based and has not focused on specific problems and concerns. For example, many wastewater facilities are now facing very stringent phosphorus control standards. When there is already a wastewater treatment facility in place, it becomes prudent to consider the possibility of modifying these existing facilities in order to meet new standards being imposed. Obviously costs, both initial and operating, are of main concern. One important concern then is to evaluate the economics of modifying existing treatment facilities to accomplish biological phosphorus removal.

Beyond the problem of modifying an existing wastewater facility to accomplish effective and efficient biological phosphorus removal, there are certain unique or special problems that can be introduced into the process simply because of the geographical location of the wastewater treating facility and, the particular biological process currently being practiced. These special problems have not been addressed. In this regard, there are certain situations where the wastewater that is being subjected to secondary treatment has a relatively low BOD to phosphorus ratio, that is, a ratio within the range of 7-14. This presents a special problem in biologically removing phosphorus from such wastewater. It is generally appreciated that the higher the BOD to phosphorus and BOD/TKN ratio the easier it is to biologically remove phosphorus from wastewater. Thus, in some geographical locations, where the BOD content of the wastewater is relatively low, it is more difficult to create a favorable environment for the phosphorus consuming microorganisms and consequently, it is more difficult to biologically remove phosphorus. The difficulty is so pronounced that some commercially available processes that claim to biologically remove phosphorus from wastewater will not even warrant their process in wastewater conditions where there is such a relatively low BOD to phosphorus and TKN ratio. The Bardenpho process requires a $BOD_5/TKN$ ratio of 6:25 or higher and the UCT process requires more than 3.6:1.0 ratio, preferably 5 or higher to assure phosphorus removal.

Therefore, there is a need for a biological phosphorus removal process that is particularly designed and suitable for incorporation into an existing conventional wastewater facility. Further, there is a need for an efficient and effective biological phosphorus removal process that is capable of working with wastewater that has a relatively low BOD to phosphorus and TKN ratio due to pretreatment by a fixed film reactor, chemical pretreatment, or influenced by low $BOD_5/TKN$ and low $BOD_5/TP$ industrial wastes.

There are certain geographical areas that also require that discharges meet certain nitrogen limits, typically 3-5 mg/l. Furthermore, it is expected that many wastewater facilities will be required to comply with nitrogen effluent limits in the future. This is because there is a growing concern about the nitrate level of wastewater dumped into receiving streams. In particular, there is growing government and public concern over the quality of drinking water as the nitrate level in the water has the potential to kill wildlife as well as to be a health risk to humans consuming such water.

To control the level of nitrogen in the wastewater effluent, one has to direct his attention to controlling the level of nitrate in the wastewater effluent. This is because of the nature of wastewater influent and conventinal processes utilized to treat wastewater. Typically, most wastewater facilities and their treatment processes will be designed to remove and control ammonia nitrogen, $NH_4$. In the process of doing that, nitrates will be formed and will exist in the discharge. Consequently, to control nitrogen, a process must be directed at removing nitrites and nitrates, $NO_2$ and $NO_3$.

Fundamentally to do this, the process must include a vehicle for removing oxygen from the nitrate compound so that the associated nitrogen can escape to the atmosphere.

There are physical and chemical processes for removing ammonia nitrogen and nitrates from the wastewater. But these processes have serious drawbacks in that they tend to be prohibitively expensive and beyond that, they often are found to be most incompatable with co-existing processes for removing other pollutants from the same wastewater. It is not unusual for such a nitrogen removing process to have such an adverse affect on another co-existing pollutant removal process that that process becomes totally ineffective and consequently the entire process fails.

For some time now, many wastewater facilities having been moving to biological processes for removing the more conventional pollutants of concern such as phosphorous, ammonia nitrogen, BOD, suspended solids, etc. It is widely accepted by many authorities in the wastewater treatment fields that biological processes are the most economical and practical way of treating wastewater in most situations. That is supported by the great number of wastewater facilities that have been designed to carry out biological wastewater treatment in recent years.

There have been attempts at biologically controlling nitrogen by incorporating an anoxic zone downstream from a series of preceeding zones that would typically include aerobic an anerobic zones. In order to remove and control those pollutants traditionally considered of prime importance, such as ammonia nitrogen, BOD, and phosphorous, these biological processes require that the anaerobic and oxic zones be disposed in the initial stages of treatment. Consequently, by the time the wastewater or mixed liquor has reached the downstream anoxic zone, there is very little, if any, food source for the microorganisms and without food the effectiveness of downstream denitrification is seriously hampered and usually inefficient. Besides that, the overall effectiveness of such a biological denitrification process depends on flow and the overall makeup of the wastewater which can vary sharply from time to time.

Therefore, there is a need for a biological denitrification process that itself can be controlled so as to vary and maintain the food level within the anoxic zone at an appropriate level to effectively denitrify to a level of approximately 3 milligrams per liter irrespective of flow, wastewater makeup, or any other factor that might affect denitrification.

SUMMARY AND OBJECTS OF THE INVENTION

The present invention entails a wastewater treatment process that is particularly designed to remove phosphorus, nitrogen and other pollutants from raw wastewater having a relatively low BOD to phosphorus ratio. In particular, the present process entails directing raw wastewater through a trickling filter and producing an effluent that is directed through a main stream of secondary treatment that includes both oxic, and if required, anoxic treatment zones. After biological processing, sludge is recovered from the purified wastewater and returned for contact with a side stream prior to contact with the main stream and is referred to as return activated sludge. This return activated sludge is continually recycled and fed back to the main stream.

Suspended organics are separated from the wastewater tank that produces soluble substrates including acetic acid. The produced soluble substrates are mixed and combined with the return activated sludge in a side stream processing step to form conditioned return activated sludge. This conditioned return activated sludge is then directed back to the main stream where it is mixed with trickling filter or RBC effluent in an initial contact zone that is aerobic. Thereafter the mixture of pretreated wastewater and conditioned return activated sludge is directed through a series of stages, including both oxic and anoxic zones, where nitrogen, phosphorus and other pollutants are removed.

The present invention also entails a second design and system that specifically aims at creating a favorable environment for the selection, growth and proliferation of phosphorous consuming microorganisms. In this second design, the return activated sludge is approximately equally divided into two streams, one of which is directed into a feeding cell which forms a part of a sludge nutrification chamber. This feeding cell is directly coupled to the fermentation tank and soluble substrates from the fermentation tank are directed into the feeding cell. By splitting the flow of the return activated sludge and directly feeding only a portion of the microorganisms this effectively increases the food to mass ratio as to the microorganisms being fed. This increased food to mass ratio forms a more favorable environment for the selection, growth and prolieferation of phosphorous consuming microorganisms.

It is therefore an object of the present invention to provide a wastewater treatment process for biologically removing phosphorus, nitrogen, and other pollutants and that is particularly adapted to be effective in treating wastewater having a relatively low BOD to phosphorus and BOD to TKN ratio.

An additional objective of the present invention resides in the provision of a wastewater treatment process for biologically removing phosphorus that entails pretreating raw wastewater so as to reduce the BOD to phosphorus and BOD to TKN ratio of the pretreated wastewater prior to its mixture with return activated sludge.

Another object of the present invention resides in the provision of a wastewater treatment process that utilizes fermented raw sludge or other readily available waste organic material as a source of nutrients for microorganisms contained within the return activated sludge.

A more specific object of the present invention is to provide a wastewater treatment process of the character referred to above wherein the fermented raw sludge forms soluble substrates that are mixed and combined with return activated sludge in a side stream to form conditioned return activated sludge which is then directed back to a main stream where the conditioned return activated sludge is mixed and combined with pretreated wastewater effluent.

Another object of the present invention resides in the provision of a wastewater treatment process of the character referred to above wherein the conditioned return activated sludge is mixed with the pretreated wastewater effluent in a first initial contact zone that is aerobic.

It is also an object of the present invention to provide a wastewater treatment process of the character referred to above wherein the wastewater is pretreated (or of unusual $BOD_5/TKN$ ratio) prior to its mixture with the conditioned return activated sludge such that its BOD to phosphorus ratio is ten or less and BOD to TKN radio is less than four or less than 60% of the ratio in the influent wastewater.

Another object of the present invention resides in the provision of a wastewater process wherein nitrification is a principal priority and is accomplished by pretreating raw wastewater by passing the same through a fixed film reactor and then directing the fixed film reactor effluent to a first aerobic treatment zone where the nitrification process begins.

Another object of the present invention is to provide a wastewater treatment process that focuses on forming a favorable environment for the selection, growth and proliferation of phosphorous consuming microorganisms.

A further object of the present invention resides in the provision of a wastewater treatment process of the character referred to above that increases the food to mass ratio of microorganisms in a selected portion of the return activated sludge and wherein the increased food to mass ratio gives rise to a favorable environment for the selection, growth and proliferation of phosphorous consuming microorganisms.

Another object of the present invention is to provide a wastewater treatment process wherein the increased food to mass ratio is achieved by splitting the flow of return activated sludge into at least two streams and directing at least one of the split streams to a sludge nutrification feeding cell where that portion of the return activated sludge is fed directly by a fermentation tank or some other source, thereby effectively reducing the number of microorganisms competing for the available food or soluble substrates.

It is also an object of the present invention to provide a biological wastewater treatment process that provides for effective and efficient denitrification.

Still a further object of the present invention is to provide a biological wastewater process that is effective and efficient in both removing and controlling phosphorous and nitrogen.

Still a further object of the present invention resides in the provision of a biological wastewater treatment process that utilizes a fermentor that produces and generates volatile fatty acids that are directed to one or more anoxic treatment zones for the purpose of denitrification.

Other objects and advantages of the present invention will become apparent and obvious from a study of the following description and the accompanying drawings which are merely illustrative of such invention.

DETAILED DESCRIPTION OF THE INVENTION

The present invention entails a wastewater treatment process that has the objective of removing BOD, nitrogen, phosphorus, and other pollutants from a wastewater stream. As will be understood from subsequent portions of this disclosure, the process of this invention entails secondary treatment that relies on basic biological processes to remove BOD, nitrogen, phosphorus, and other pollutants from the wastewater.

Figure 1:
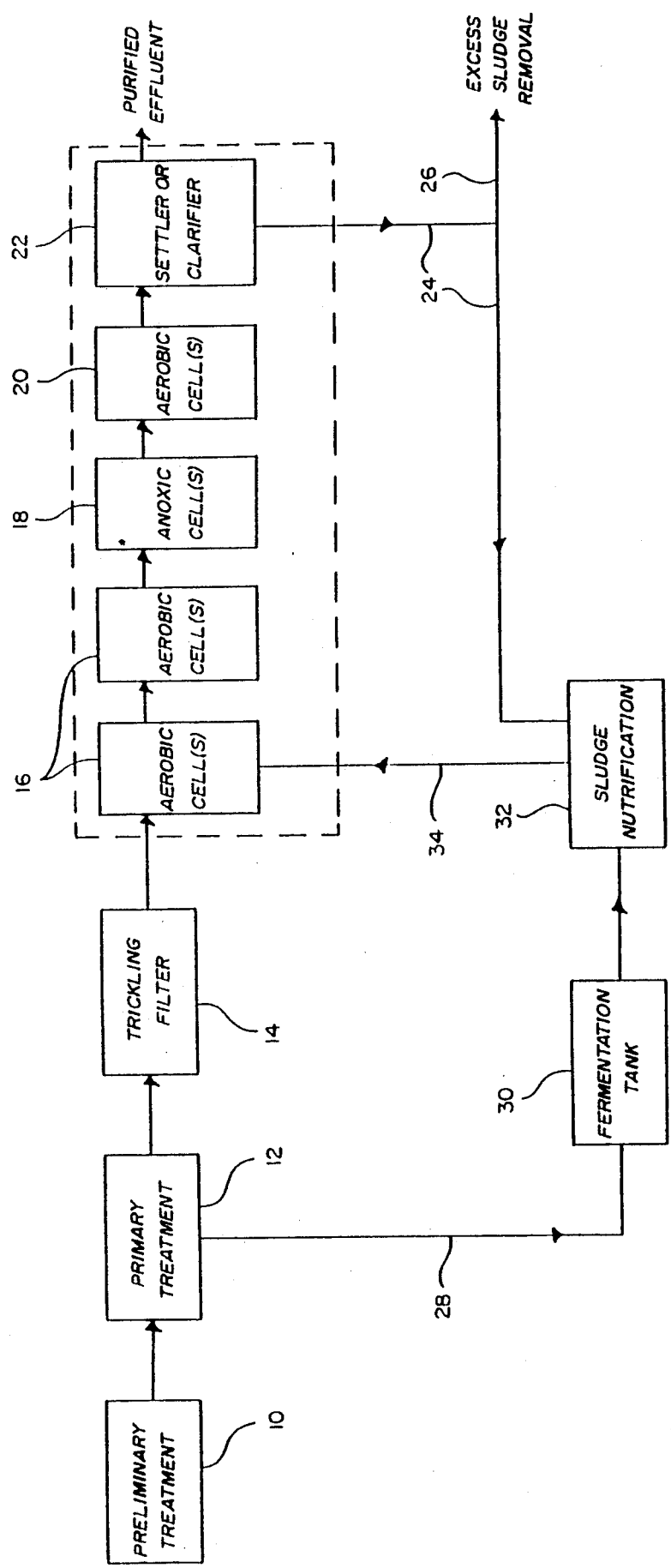
FIG. 1 is a schematic view illustrating the basic wastewater treatment process of the present invention.

With further reference to FIG. 1, in a conventional fashion, raw wastewater enters a preliminary treatment area 10. During the course of preliminary treatment, grit and damaging debris such as cans, bath towels, etc., are removed from the wastewater.

Effluent from the preliminary treatment area 10 is directed to a primary treatment zone or area 12. Again, in conventional fashion, the primary treatment process is a physical settling or retention process where organics are removed from the wastewater through flotation or sedimentation.

From the primary treatment area 12, wastewater effluent is directed to a fixed film reactor such as a trickling filter system 14. The trickling filter system 14 provides an initial biological treatment process for treating the raw wastewater.

From the trickling filter system 14, the raw wastewater effluent is directed through a series of secondary treatment zones or areas, some being aerobic and some being anoxic if nitrogen removal is required.

In particular, from the trickling filter 14, the pretreated raw wastewater is first directed to and through a series of aerobic cells or zones 16. Here the pretreated wastewater is aerated and agitated. For example, one aerobic cell having a 280,000 gallon capacity would receive a portion of the air supplied by a 150 horse power blower that would direct air upward through the contained wastewater. During this phase of the wastewater treatment, the process starts to nitrify ammonia. This, as will be understood from subsequent portions of this disclosure, is a biological process. The amount of ammonia nitrogen, NH$_4$N, in the wastewater can vary depending upon geographical location, season of the year, etc., but it is not uncommon for the wastewater to contain 15 to 20 PPM ammonia nitrogen.

Essentially, during these initial aerobic treatment stages, the supply of compressed air to the wastewater provides substantial oxygen to selected microorganisms which in turn results in the ammonia being oxidized, causing the amonia nitrogen to be converted to a nitrite or nitrate form, both referred to as NO$_X$.

Thus, the pretreated raw wastewater is directed through one or more aerobic treatment zones 16 where the various pollutants contained in the wastewater are subjected to biological processes that are directed at removing various pollutants from the wastewater. The time or duration that the wastewater is subjected to such aerobic treatment can vary depending on conditions of the wastewater, season, etc. The present process, however, contemplates that the pretreated raw wastewater will be subjected to aerobic treatment for approximately 2-8 hours. In the case of one preferred process and design, it is to be appreciated that there may be more than one aerobic container or cell and that the pretreated wastewater may be directed or routed from one aerobic cell or container to another. In FIG. 1, for purposes of illustration, there is shown two aerobic cells 16, but it is understood that the number of such cells could vary depending on various factors.

After the nitrification process, the wastewater can be transferred to an anoxic cell 18. Anoxic cell 18 functions as a denitrification chamber inasmuch as it converts the nitrate-nitrogen present in the influent to elemental nitrogen. While there may be oxygen present in a form combined with nitrogen, there is no significant amount of dissolved oxygen present in the anoxic treatment cell 18. The wastewater being treated is held within the anoxic cell 18 for a selected time period which in the case of the present process is approximately 1-3 hours. It is understood that in the anoxic cell 18 there would be no supply of external oxygen but the wastewater therein would be continuously mixed by recirculation. As pointed out above, this anoxic treatment zone 18 serves to denitrify, that is to reduce the NO$_X$ levels of the wastewater. This can be accomplished since the microorganisms are continuing to seek oxygen and because of the absence of such in a dissolved form, they start to reduce the NO$_X$ compounds to nitrogen gas. This leaves nitrogen in a stable gaseous form (N$_2$) and consequently permits the same to escape the liquid surface to the atmosphere.

From the anoxic cell 18, the wastewater is then conveyed to an aerobic cell or treatment zone 20 which functions as a stabilization chamber inasmuch as oxygen is added to the influent. In aerobic cell 20, air is supplied and directed upward through the contained wastewater. The amount of air supplied may vary but approximately 10-15 cubic feet per minute per 1000 cubic feet of volume may be adequate for MLSS up to 2000 mg/l. The wastewater is held in aerobic cell 20 for approximately 45 minutes. This operation of the process should increase the amount of dissolved oxygen in the wastewater in the aerobic zone to a level of about 2-4 ppm.

The effluent from aerobic cell 20 is then directed to a settler or clarifier 22. The purified effluent exits from the settler or clarifier 22 and is discharged into a stream or other designated receiving area.

During the wastewater treatment process, sludge settles in clarifier 22 and is drawn off by means of a pump (not shown). This sludge taken from clarifier 22 is directed to a side stream and more particularly to a return sludge line 24. To rid the system of excess sludge, there is provided an excess sludge discharge line 26 for selectively discharging certain quantities of sludge over a give period of time. This excess sludge is directed to sludge digesters or other suitable sludge disposal means. Therefore, it is appreciated that the present wastewater treatment process produces sludge and selected quantities of the sludge is recycled through a side stream return sludge line 24. The sludge passing in the side stream and through the return sludge line 24 is referred to as return activated sludge.

The present process contemplates conditioning this return activated sludge prior to it being brought back into the main stream and mixed with the trickling filter effluent. To condition the return activated sludge, the present process utilizes primary sludge separated from the wastewater at the primary treatment area 12. This primary sludge is conveyed from the primary treatment area 12 through a primary sludge line 28 to a fermentation tank 30 located in a side stream with respect to the main wastewater treatment stream. Over a period of two to five days, organic matter in fermentation tank 30 will produce a high concentration of soluble substrates, including acetic acid. These soluble substrates are then directed into a sludge nutrification chamber 32 that is likewise located in the side stream. Mixed with the soluble substrates within the sludge nutrification chamber 32 is the returned activated sludge. The soluble substrates and return activated sludge are mixed and held within sludge nutrification chamber 32 approximately three hours. This process produces effluent containing a controlled level of microorganisms which have been conditioned to effect the removal of phosphorus from wastewater. It should be noted that the conditions existing in and around the sludge nutrification chamber are essentially anaerobic although the return sludge input could be anoxic. The effluent produced by the sludge nutrification chamber 32 is referred to as conditioned return activated sludge.

The conditioned return activated sludge is directed through line 34 to the first or initial aerobic treatment zone 16 where the conditioned return activated sludge is mixed with the trickling filter effluent under aerobic conditions. It is to be emphasized that this is the first contact of the conditioned return activated sludge with the wastewater effluent, all of which occurs in an initial aerobic contact and treatment zone 16. The conditioned activated sludge may be supplemented with acetic acid chemical in the sludge nutrification chamber 32.

Therefore, it is appreciated that raw wastewater is first directed through preliminary and primary treatment areas 10 and 12 respectively. Primary effluent is directed to and through a fixed film reactor, such as a trickling filter system, after which the trickling filter effluent is directed through a secondary main stream treatment process. At the end of the main stream, sludge is removed from the wastewater and returned through a side stream. During the return, the return activated sludge is conditioned and then mixed with the wastewater effluent in the main stream.

The present biological process has been developed to remove a number of pollutants from the wastewater. Among the pollutants that is the target of the present biological process is phosphorus. In order to remove phosphorus from the wastewater, specific microorganisms are utilized to remove phosphorus from the wastewater. In a broad sense, select microorganisms are developed and growth enhanced in the nutrification chamber 32 to later remove phosphorus in the aerobic reactors. In the nutrification chamber, the microorganisms of the return activated sludge consume soluble substrates produced by the fermentation tank 30. These soluble substrates including acetic acid are metabolized and stored within the respective microorganisms in the anaerobic nutrification zone. While the microorganisms are consuming and storing the soluble substrates, such as acetic acid, they are at the same time releasing some phosphorus.

This conditioned activated sludge is then transferred to the main stream and particularly to an initial aerobic treatment zone 16. The presence of substantial air and oxygen causes the microorganisms to begin to metabolize the soluble substrates consumed in the nutrification chamber 32. In order to sustain the metabolization of these soluble substrates, the microorganisms need phosphorus. Because the microorganisms have consumed an abundance of soluble substrates prior to reaching the main treatment stream, it follows that when they are subjected to an aerobic environment that metabolism is going to be substantial and accordingly, a portion of phosphorus will be required to sustain life. Accordingly, while the microorganisms move with the wastewater through the aerobic treatment zone or zones 16, they will remove some phosphorus for cell growth plus additional and substantial quantities of phosphorus to replace reserves depleted in the nutrification zone.

Besides phosphorus, the present process also is directed towards further reducing the BOD content of the wastewater. In this regard, the BOD is substantially reduced during the trickling filter process. But BOD is continued to be reduced as the wastewater moves through the aerobic treatment zones 16 be cause of the abundance of microorganisms in the presence of oxygen or air. Further, the trickling filter effluent solids will undergo aerobic stabilization.

Also, as already alluded to, it is important in many wastewater treatment processes to remove ammonia nitrogen. Again, this is accomplished by converting the ammonia nitrogen ($NH_4N$) to a nitrate nitrogen ($NO_3N$). This is accomplished as the wastewater passes through the aerobic treatment zone 16. Thereafter, once the wastewater enters the anoxic stage of the process, denitrification occurs and the nitrates are reduced by the microorganisms, leaving the nitrogen in the form of a gas ($N_2$) which escapes the liquid surface to the atmosphere.

The present biological wastewater treatment process can be utilized in wastewater treatment facilities having various capacities. For example, the present process was found appropriate for a wastewater treatment facility having a trickling filter effluent of 4.5 to 6.5 million gallons per day. In such a process it is estimated that the return activated sludge would be approximately 40% of the trickling filter effluent. For such a capacity it is contemplated that approximately 75,000 gallons per day of primary sludge would be conveyed from the primary treatment area 12 through line 28 to fermentation tank 30. As already pointed out, the expected duration for fermentation would be approximately 2 to 5 days. It is contemplated that approximately 40,000 gallons per day of soluble substrates would be conveyed from the fermentation tank 30 to the sludge nutrification container 32. In addition, in such a process, it is contemplated that the life or time period (mean cell residence time) of the activated sludge would be approximately 5 to 15 days. Since the sludge is being continuously discarded, it follows that approximately 6.5-20% of the return activated sludge would be discarded daily.

The following is an example of a wastewater treatment process wherein untreated wastewater having a BOD of 250 mg/l and a phosphorus content of 8.1 mg/l was treated according to the process shown in FIG. 1. The process parameter are given in Table 1. The purified effluent from this process had a BOD of 5 mg/l and a phosphorus content of 0.7 mg/l, and an ammonia nitrogen content of 1.1 mg/l. The sludge was tested and had a SVI of 240 ml/gram at 3,860 mg/l and contained by weight 4.4 percent phosphorus.

TABLE 1

| Typical Process Operating Conditions | | | | |
|---|---|---|---|---|
| Item | Raw | Primary Effluent (incl. Recycle) | T. Filter Effluent | Final Effluent |
| Q-MGD | 5.1 | — | — | — |
| $TBOD_5$-mg/l | 250 | 170 | 90 | 5 |
| $SBOD_5$-mg/l | 85 | 90 | 30 | <2 |
| TSS-mg/l | 240 | 96 | 100 | 12 |
| TKN-mg/l | 40 | 37 | 37 | — |
| $NH_4N$-mg/l | 28 | 29 | 27 | 1.1 |
| $NO_3N$-mg/l | 0 | 0 | 0 | 8.0 |
| TP-mg/l | 8 | 8 | 8 | 0.7 |
| Detention times of reactors | | | | |
| Fermentaton | | 3.5 days | | |
| Nutrification | | 3.0 hours | | |
| Aerobic Mixed Liquor | | 6.6 hours (Q) | | |
| Anoxic Mixed Liquor | | 2.6 hours (Q) | | |
| Settling | | 9.8 hours | | |
| Biological System Operation | | | | |
| RAS | 2.0 MGD | | | |
| MLSS | 3860 mg/l | | | |
| MASS | 60150 lbs. | | | |
| MCRT | 11.1 days (excluding clarifier and nutrification solids) | | | |
| Yield | 0.77 lb excess sludge/lb $BOD_5$ removed | | | |
| Yield | 5404 lb/d | | | |
| $F_R/M$ | 0.12 lb $BOD_5R$/lb MLSS/d | | | |

Figure 2:
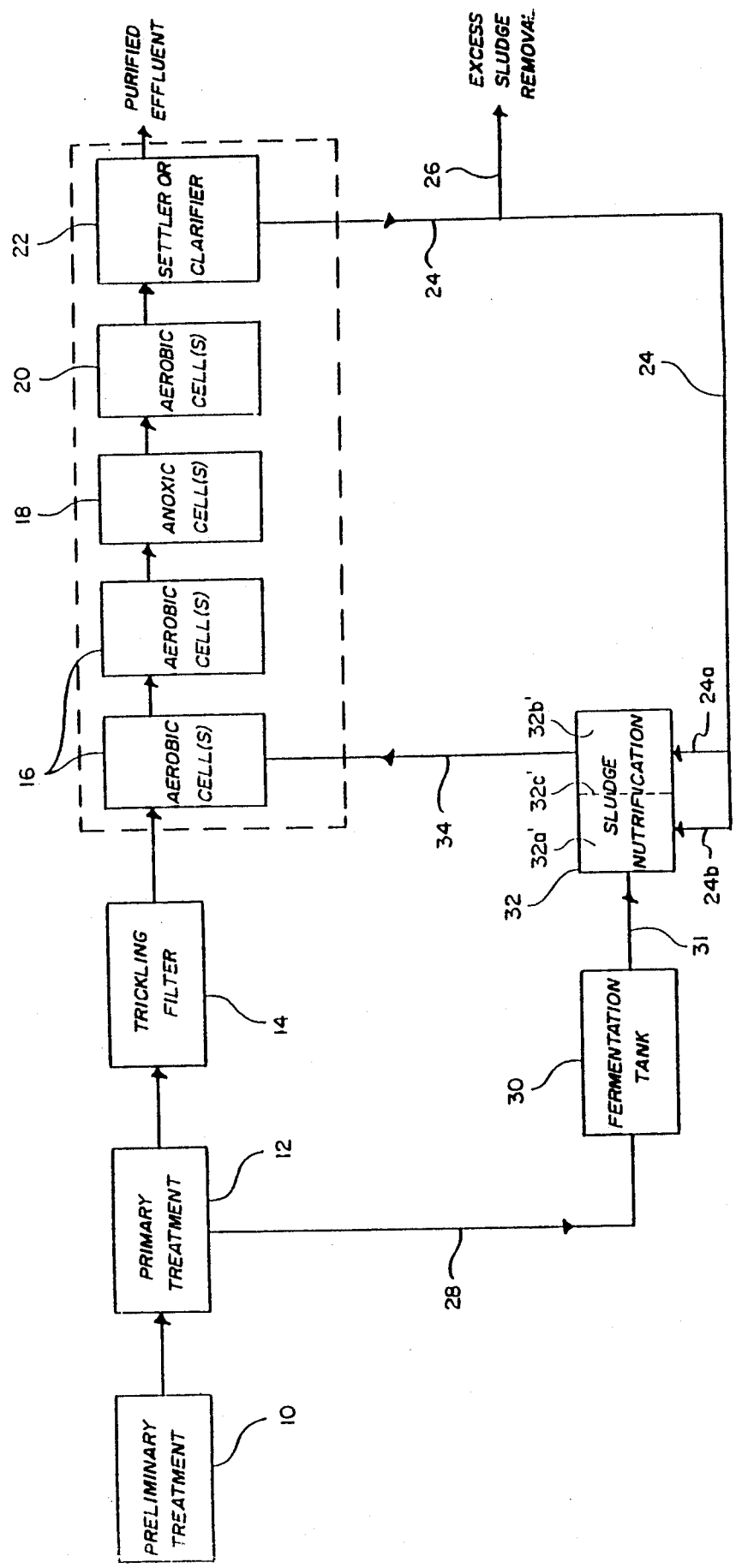
FIG. 2 is a schematic view illustrating a second design and wastewater treatment process of the present invention.

The present invention entails a second design and wastewater treatment process that is schematically illustrated in FIG. 2. The process and system shown in FIG. 2 is referred to as a split flow return activated sludge process. The process disclosed in FIG. 2 is essentially the same process shown in FIG. 1 and described above with the exception of the design of the nutrification chamber 32 and the manner of directing return activated sludge to and through the same.

Viewing FIG. 2, it is seen that the sludge nutrification chamber 32' includes two separate cells, a feeding cell 32a' and a separation cell 32b'. Cells 32a' and 32b' are separated by a partition 32c'. Partition 32c' in the present process is of a design that will permit flow to pass from feeding cell 32a' to separation cell 32b'.

Return activated sludge line 24 is split into lines 24a and 24b. Line 24a is connected to separation cell 32b' while line 24b is connected to feeding cell 32a'.

Fermentation tank 30 is connected through line 31 to the feed cell 32a'. Line 34 connected between the nutrification chamber 32' and the aerobic cell or cells 16 extends from the separation cell 32b'.

In operation, return activated sludge passing in line 24 is split into approximately 2 equal flows or streams that are directed into lines 24a and 24b. The return activated sludge passing in line 24a is directed into separation cell 32b'. Return activated sludge passing through line 24b is directed into feeding cell 32a'. Because of the presence of partition 32c' it is appreciated that the microorganism within cell 32a' are isolated from those in cell 32'.

In the process shown in FIG. 2, feeding cell 32a' is fed with soluble substrates from the fermentation tank 30. The sludge and soluble substrates are mixed in a anerobic environment and in a manner similar to the process of FIG. 1. Because the return activated sludge in the case of the present process is approximately equally split, it follows that the number of microorganisms competing for the available food or soluble substrates from the food source or fermentation tank 30 is decreased. This effectively increases the food to mass ratio in the feeding cell 32a'. This in turn creates a more favorable environment for the selection, growth and proliferation of phosphorus consuming microorganisms.

In the case of the process and design of FIG. 2, the basic conditions and parameters discussed with respect to the process shown in FIG. 1 apply. In the case of the process described and shown in FIG. 2, the conditioned return activated sludge found in feeding cell 32a' simply flows over the top of partition 32c into separation cell 32b where it is mixed and combines with the sludge therein and eventually exits the nutrification chamber 32' via line 34.

Figure 3:
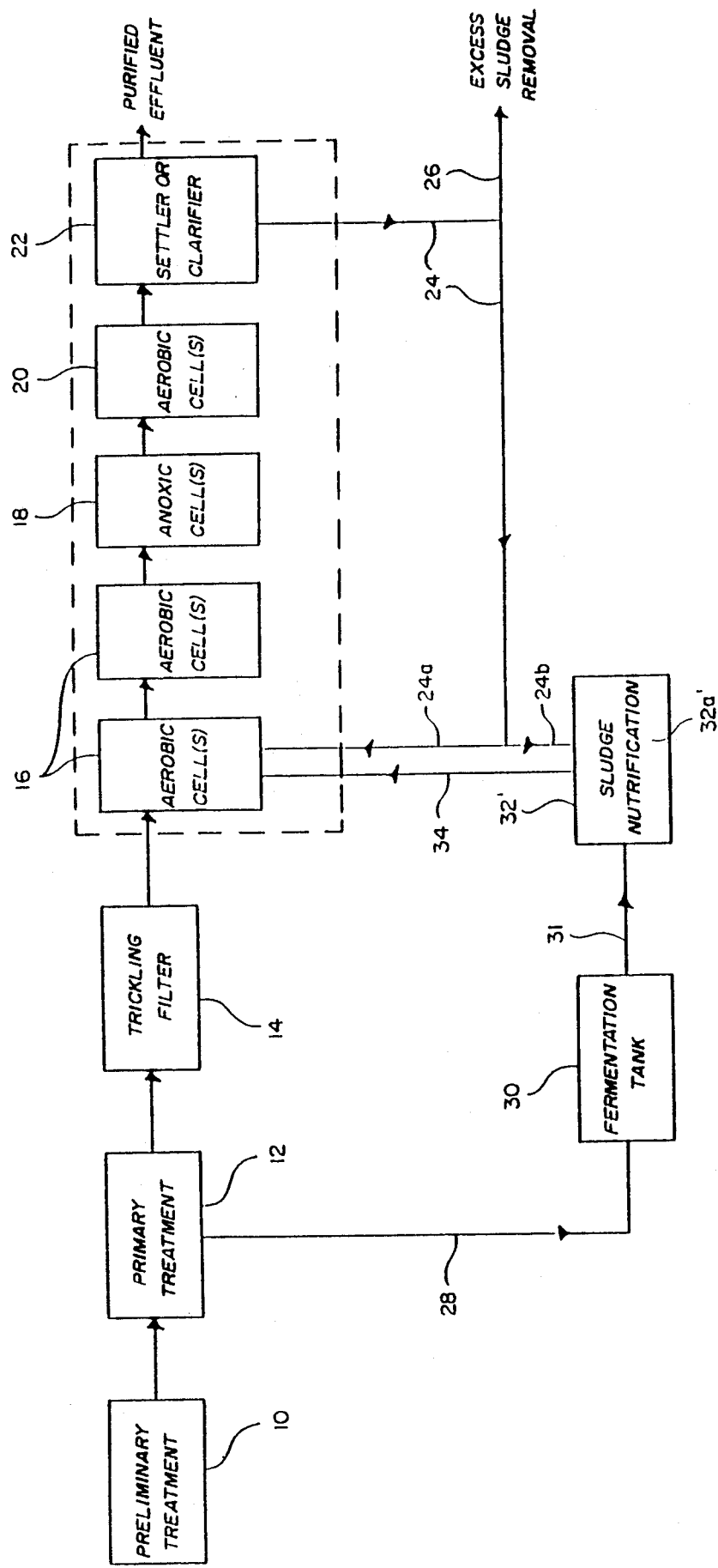
FIG. 3 is a schematic view illustrating an alternate design for the wastewater treatment process illustrated in FIG. 2.

In FIG. 3, there is shown an alternate design for the split flow return activated sludge process just described. In this alternate design, the return activated sludge can be split such that one portion or one stream 24a of the return activated sludge is routed directly back to the aerobic cell or cells 16, completely bypassing the nutrification chamber 32'. In this case, flow line 24a is directed to one or more of the aerobic cells 16 while line 24b is directed to a feeding cell 32a' that is communicatively connected with the fermentation tank 30.

Table 2 shows typical process operating perameters and condition for the split flow return activated sludge process shown in FIG. 2. It is seen that the basic parameters and results generally conform to those depicted in Table 1 that represent the process shown in FIG. 1. However, it is noted that for wastewater having a BOD of 250 mg/l and a phosphorous content of 6 mg/l, that the purified effluent from the process of FIG. 2 had a BOD of less than 5 mg/l and a phosphorous content of 0.3 mg/l, and an ammonia nitrogen content of 0.1 mg/l. The sludge was tested and had a SVI of 80 ml/g and contained by weight 4.2% phosphorous.

TABLE 2

Typical Process Operating Conditions For Split Flow Return Activated Sludge Process

| Item | Raw | Primary Effluent (incl. Recycle) | T. Filter Effluent | Final Effluent |
|---|---|---|---|---|
| Q-MGD | 6.2 | — | — | — |
| TBOD$_5$-mg/l | 250 | 170 | 90 | <5 |
| SBOD$_5$-mg/l | 85 | 90 | 30 | <2 |
| TSS-mg/l | 240 | 96 | 100 | 6 |
| TKN-mg/l | 40 | 37 | 37 | — |
| NH$_4$N-mg/l | 28 | 29 | 27 | 0.1 |
| NO$_3$N-mg/l | 0 | 0 | 0 | 8.0 |
| TP-mg/l | 6 | 6 | 6 | 0.3 |

| Detention times of reactors | |
|---|---|
| Fermentation | 3.5 days |
| Nutrification | 6.0 hours |
| Aerobic Mixed Liquor | 5.4 hours (Q) |
| Anoxic Mixed Liquor | 1.1 hours (Q) |
| Settling | 8.5 hours |

| Biological System Operation | |
|---|---|
| RAS | 2.0 MGD |
| MLSS | 2340 mg/l |
| MASS | 32790 lbs. |
| MCRT | 5.0 days (excludng clarifer and nutrification solids) |
| Yield | 0.77 lb excess sludge/lb BOD$_5$ removed |
| Yield ' | 6570 lb/d |
| F$_R$/M | 0.26 lb BOD$_5$R/lb MLSS/d |

Figure 4:
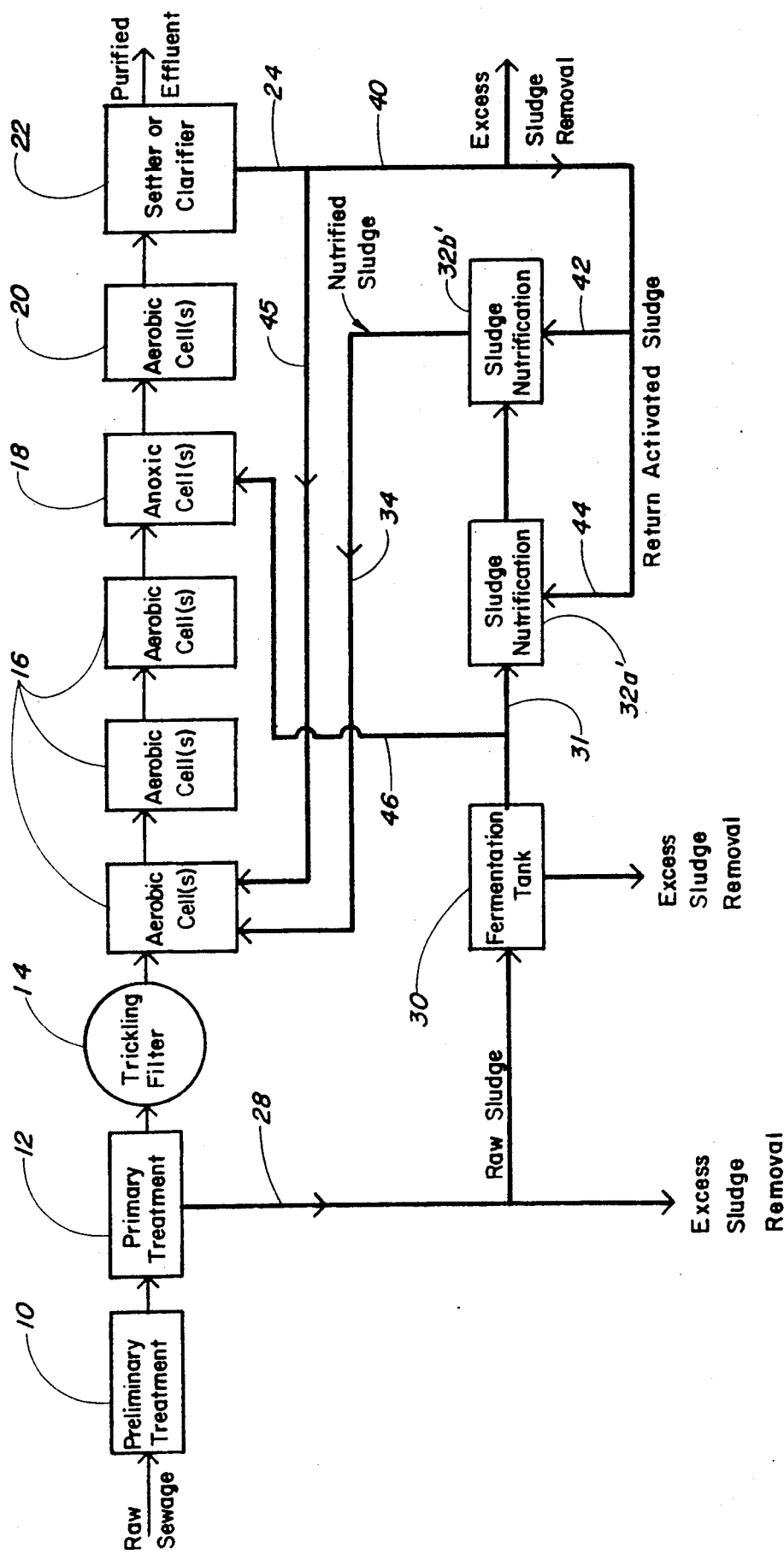
FIG. 4 is schematic illustration of a biological wastewater treatment process that utilizes the supernatant from a fermentor to effectuate denitrification.
Figure 5:
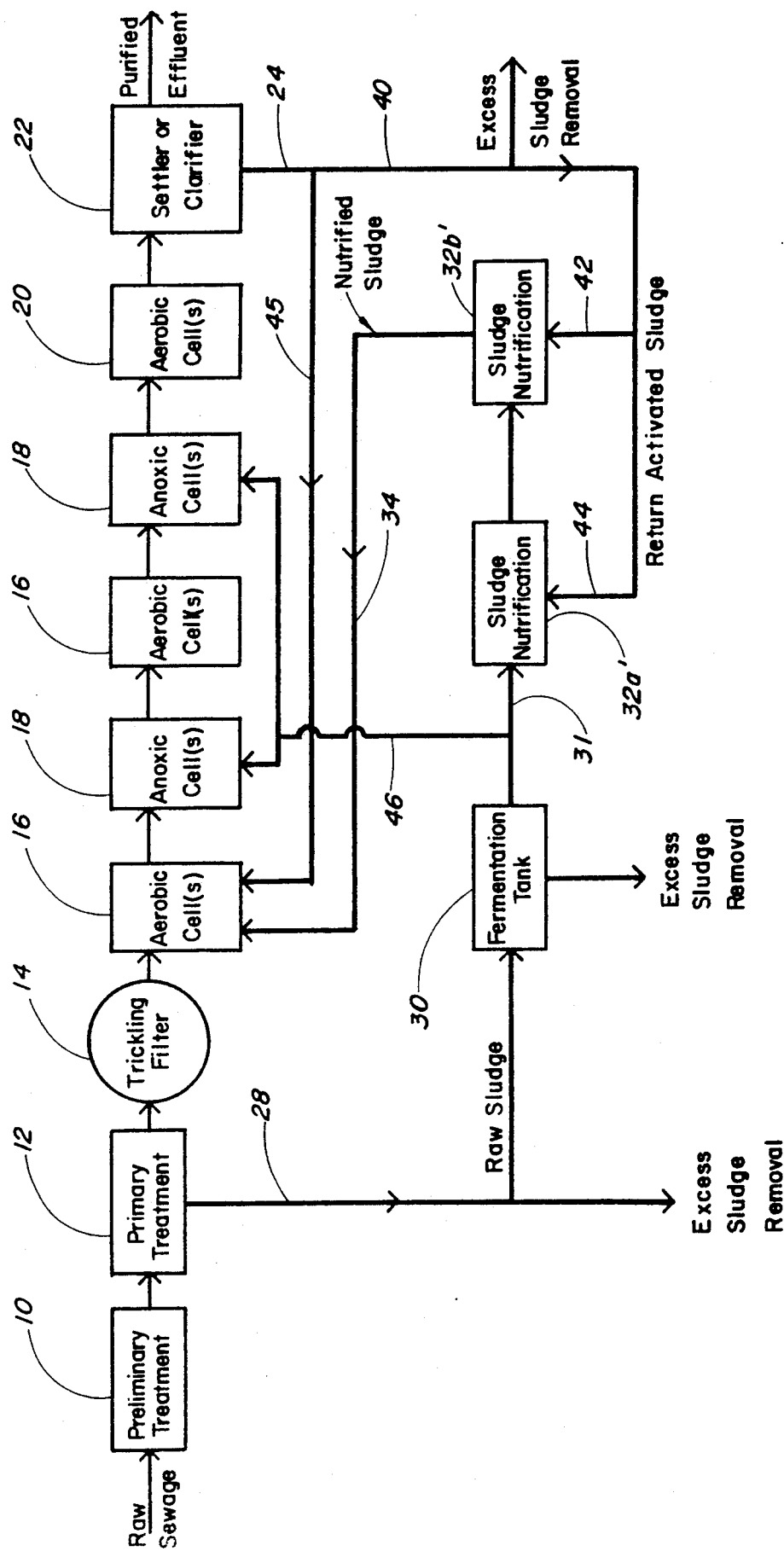
FIG. 5 is a biological wastewater treatment process that is a modification of the process shown in FIG. 4.

Now turning to FIGS. 4 and 5, there is shown therein schematics of a biological wastewater process that is specifically designed for biological enhancement of denitrification. It is appreciated that this biological enhanced denitrification process is incorporated into the basic processes already discussed and shown in FIGS. 1 through 3. But in any event, the biological enhanced denitrification process being referred to utilizes volatile fatty acids, that are produced in a fermentation process, and directing those volatile fatty acids to one or more anoxic treatment zones. Once in the anoxic treatment zone or zones the volatile fatty acids serve as a food source. In the denitrification process the volatile fatty acids are consumed by those select or certain microorganisms that give rise to denitrification. Essentially, these microorganisms consume the volatile fatty acids in the anoxic zone or zones and in the process of consuming these volatile fatty acids, these microorganisms require oxygen. Because there would be no supplied oxygen as in the case of aerobic treatment, these microorganisms are capable of consuming oxygen associated with the nitrates, NO$_2$ and NO$_3$, in the anoxic zone. As these microorganisms consume oxygen from the nitrates, the nitrogen is released to the atmosphere.

Turning to FIG. 4, there is shown therein a biological wastewater treatment process that specifically includes a biological denitrification enhancement process. It is seen that the series of treatment zones lying downstream from the trickling filter 14 includes three aerobic cells 16, followed by an anoxic cell 18, followed by an aerobic cell 20 and finally followed by a final clarifier 22. From the clarifier 22 there is a return sludge line 24 that splits into lines 45 and 40. Line 45 extends directly back to the first aerobic cell 16 while line 40 extends to an excess sludge removal line and then splits into lines 42 and 44 which return the activated sludge to the sludge nutrification cells 32a' and 32b' as discussed above and as specifically illustrated in FIG. 2. Typically, twenty-five percent of the return sludge in line 24 would be directed into line 45, leaving seventy-five percent passing into line 40. Of the seventy-five percent passing in line 40, approximately ten percent would be directed out of the system through the excess sludge removal line, leaving twenty-five percent to be directed through line 42 into cell 32b' and forty percent into line 44 and into cell 32a'.

The basic process described above is very similar to that already discussed above and depicted in FIGS. 2 and 3. But now turning to another specific aspect of the present invention, the present process provides for enhanced denitrification by the provision of line 46 that leads from line 31 to the anoxic cell 18. This enables volatile fatty acids found in the supernatant from the fermentation tank 30 to be fed directly into the anoxic cell 18.

Typically, the flow from the fermentation tank would include approximately ten percent through the excess sludge removal line leading from the fermentation tank, approximately ten percent being directed into line 46 and into the anoxic cell 18, and the remaining eighty percent directed into the sludge nutrification cell 32a'. Therefore, it is appreciated that during this process fermentor supernatant from the fermentation tank 30 is actually directed into the anoxic cell 18 to effectuate and enhance denitrification. Again, the volatile fatty acids are consumed by certain select microorganisms within the anoxic cell 18. During this process the microorganisms need oxygen to sustain metabolism and life and consequently they consume oxygen associated with the nitrates, $NO_2$ and $NO_3$ therein. This enables the nitrogen formally associated with the nitrates to escape to the atmosphere.

Typical process operating conditions for the process just described and illustrated in FIG. 4 are shown in Table 3.

Turning to FIG. 5, there is shown a process therein that is a modification of the process shown in FIG. 4 and described above. The process of FIG. 5 is essentially the same as that shown in FIG. 4 except the various treatment zones include two anoxic zones 18 separated by an aerobic zone 16. Line 46 that carries supernatant from the fermentor is split to feed both anoxic cells 18. The flow of fermentor supernatant in line 46 is such that generally equal flows are directed to each anoxic cell 18. It is contemplated that for the process shown in FIG. 5 that the flow in line 46 would be approximately the same as described for the process of FIG. 4, that is ten percent, and it is accordingly contemplated that the flows to each anoxic cell 18 would be approximately five percent. The typical process operating conditions for the process shown in FIG. 5 is set forth in Table 4.

It is appreciated that it is desirable to effectuate complete or substantially complete denitrification. To accomplish this, sufficient quantities of supernatant, that is volatile fatty acids, must be directed into the anoxic zone or zones and mixed with the contents therein without intentional aeration. That is, no air should be positively supplied or forced into the anoxic zone or zones. It is important to maintain the anoxic zone or zones truly "anoxic", meaning that the anoxic zones should be maintained such that their dissolved oxygen content is less that 0.5 ppm. By determining the concentration of nitrates, $NO_x$, within the anoxic zone or zones, the quantity of fermentor supernatant required to effectuate total or near total denitrification can be determined in conventional fashion.

The present invention may, of course, carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

TABLE 3

Typical Process Operating Conditions

| Item | Raw | Primary Effluent (incl. Recycle) | T. Filter Effluent | Final Effluent |
|---|---|---|---|---|
| Q-MGD | 6.7 | — | — | — |
| $TBOD_5$-mg/l | 250 | 170 | 90 | 5 |
| $SBOD_5$-mg/l | 85 | 90 | 30 | <2 |
| TSS-mg/l | 240 | 96 | 100 | 12 |
| TKN-mg/l | 40 | 37 | 37 | — |
| $NH_4N$-mg/l | 28 | 29 | 27 | 1.0 |
| $NO_3$-mg/l | 0 | 0 | 0 | 5.0 |
| TP-mg/l | 8 | 8 | 8 | 0.7 |

Detention ties of reactor

| | |
|---|---|
| Fermentation | 3.5 days |
| Nutrification | 6.5 hours (4.3 + 2.2) |
| Aerobic Mixed Liquor | 5.0 hours (Q) |
| Anoxic Mixed Liquor | 1.0 hours (Q) |
| Settling | 8.0 hours |

Biological System Operation

| | |
|---|---|
| RAS | 2.0 MGD |
| MLSS | 3860 mg/l |
| MASS | 60150 lbs. |
| MCRT | 11.1 days (excluding clarifier and nutrification solids) |
| Yield | .77 lb excess sludge/lb $BOD_5$ removed |
| Yield | 5404 lb/d |
| $F_R/M$ | 0.12 lb $BOD_5R$/lb MLSS/d |

TABLE 4

Typical Process Operating Conditions

| Item | Raw | Primary Effluent (incl. Recycle) | T. Filter Effluent | Final Effluent |
|---|---|---|---|---|
| Q-MGD | 6.7 | — | — | — |
| $TBOD_5$-mg/l | 250 | 170 | 90 | 5 |
| $SBOD_5$-mg/l | 85 | 90 | 30 | <2 |
| TSS-mg/l | 240 | 96 | 100 | 12 |
| TKN-mg/l | 40 | 37 | 37 | — |
| $NH_4N$-mg/l | 28 | 29 | 27 | 1.0 |
| $NO_3N$-mg/l | 0 | 0 | 0 | 3.0 |
| TP-mg/l | 8 | 8 | 8 | 0.7 |

Detention times of reactors

| | |
|---|---|
| Fermentation | 3.5 days |
| Nutrification | 6.5 hours (4.3 + 2.2) |
| Aerobic Mixed Liquor | 4.0 hours (Q) |
| Anoxic Mixed Liquor | 2.0 hours (Q) |
| Settling | 8.0 hours |

Biological System Operation

| | |
|---|---|
| RAS | 2.0 MGD |
| MLSS | 3860 mg/l |
| MASS | 60150 lbs. |
| MCRT | 11.1 days (excluding clarifier and nutrification solids) |
| Yield | 0.77 lb excess sludge/lb $BOD_5$ removed |
| Yield | 5404 lb/d |
| $F_R/M$ | 0.12 lb $BOD_5R$/lb MLSS/d |

What is claimed is:

1. A process for removing both phosphorus and nitrogen from wastewater comprising the steps of:
    (a) directing raw sewage into a primary treatment area and treating the same and in the process separating the raw sewage into settled sewage and raw sludge;
    (b) directing the settled sewage in and through a main stream secondary treatment area and particularly subjecting the settled sewage to a first aerobic treatment zone, followed by an anoxic treatment zone, after which the settled sewage is subjected to a second aerobic treatment zone;

(c) passing the effluent from the main stream secondary treatment area to a settling zone and separating the secondary treatment effluent into purified wastewater and settled sludge;
(d) returning the settled sludge to a sidestream sludge nutrification zone that lies outside of the main stream secondary treatment area;
(e) directing the separated raw sludge from the primary treatment area to a sidestream fermenter and fermenting the raw sludge to produce a fermented supernatant that includes volatile fatty acids;
(f) transferring fermenter supernatant from the fermenter and splitting the fermenter supernatant into at least two streams;
(g) transferring one stream of the fermenter supernatant to the sidestream nutrification zone and mixing the fermenter supernatant with the settled sludge to form conditioned activated sludge and holding the conditioned activated sludge within the nutrification zone a selected time period;
(h) conveying the conditioned activated sludge to the main treatment area and particularly to the first aerobic treatment zone that precedes the anoxic treatment zone and mixing the conditioned activated sludge with the settled sewage in the first aerobic treatment zone;
(i) wherein the fermenter supernatant and the volatile fatty acids associated therewith form a favorable food source for phosphorus removing microorganisms that is consumed in the nutrification zone; and
(j) transferring the other stream of the fermenter supernatant to the anoxic zone in the main stream and mixing the fermenter supernatant with the settled sewage to give rise to denitrification in the anoxic zone as the volatile fatty acids associated with the fermenter supernatant provides a favorable food source that is consumed by denitrifying microorganisms in the anoxic zone.

2. The method of claim 1 wherein the series of treatment zones includes a series of anoxic treatment zones and wherein the process includes directing portions of the produced volatile fatty acids to each of the series of anoxic treatment zones to achieve effective denitrification.

3. The method of claim 1 including the step of passing the settled sewage through a fixed film reactor prior to the settled sewage being directed through the secondary treatment area, resulting in the removal of BOD from the sewage prior to the sewage being directed to the anoxic treatment zone thereby resulting in a relatively low BOD concentration in the settled sewage just prior to its entry into the anoxic zone compared to the BOD concentration of the settled sewage prior to its being passed through the fixed film reactor.

* * * * *